United States Patent
Callahan et al.

[11] Patent Number: 5,519,977
[45] Date of Patent: May 28, 1996

[54] JOIST REINFORCING BRACKET

[76] Inventors: Robert M. Callahan, 601 Woodlawn Ave., Blue Ridge, Va. 24064; Ronald B. Shiflett, Rte. 2, Box 562, Goodview, Va. 24095

[21] Appl. No.: 494,600

[22] Filed: Jun. 23, 1995

[51] Int. Cl.⁶ ...................................................... E04B 1/38
[52] U.S. Cl. ............................................... 52/712; 52/715
[58] Field of Search .......................... 52/220.8, 712, 52/715, 720.1, 729.5, 731.7, 634, 635, 696, 690, 691, 692

[56] References Cited

U.S. PATENT DOCUMENTS

| | | |
|---|---|---|
| 863,786 | 8/1907 | Curlett. |
| 1,081,647 | 12/1913 | Wolhaupter ........................... 52/635 |
| 1,938,818 | 12/1933 | Erickson et al.. |
| 2,114,901 | 4/1938 | Henderson ......................... 52/731.7 X |
| 2,425,025 | 8/1947 | Boisselier. |
| 2,483,560 | 10/1949 | Peterson. |
| 2,602,936 | 7/1952 | Erickson et al.. |
| 3,090,088 | 5/1963 | Foley et al.. |
| 3,349,535 | 10/1967 | Balinski ................................... 52/634 |
| 3,925,948 | 12/1975 | Sauer et al. ........................... 52/696 X |
| 4,413,458 | 11/1983 | Ting ................................... 52/731.9 X |
| 4,720,957 | 1/1988 | Madray .................................. 52/731.7 |
| 4,793,113 | 12/1988 | Bodnar ................................... 52/634 X |
| 5,109,646 | 5/1992 | Colonias et al.. |
| 5,452,551 | 9/1995 | Charland et al. .................. 52/220.8 X |
| 5,467,570 | 11/1995 | Leek .......................................... 52/712 |

*Primary Examiner*—Lanna Mai
*Attorney, Agent, or Firm*—Stephen R. Greiner

[57] ABSTRACT

A bracket for reinforcing a wooden joist provided with a hole for the passage of a utility conduit. The bracket includes a base wall having a central opening, sized to accommodate the utility conduit, for positioning against one side of the wooden joist. A pair of integral side walls extend at right angles from the base wall. A pair of integral flanges extend at right angles from the pair of side walls so as to be parallel to the base wall.

17 Claims, 2 Drawing Sheets

5,519,977

JOIST REINFORCING BRACKET

FIELD OF THE INVENTION

The present invention relates generally to supports and, more particularly, to a bracket integrally formed of sheet material for reinforcing a wooden joist having a hole provided therein.

BACKGROUND OF THE INVENTION

Floor systems are the horizontal supporting surfaces of a building structure. Such floor systems not only support the contents of a building but also carry the weight of their own constituent parts and any extra load from floors and walls above. To avoid collapse, a floor system must readily transfer these loads laterally to beams, columns or bearing walls with a satisfactory margin of safety.

In residential construction, the conventional floor system is assembled from a plurality of horizontal, wooden beams or joists overlaid with a plane of sheathing material. Depending upon the strength of the materials utilized, the depth of such a floor system may be varied somewhat and still meet accepted standards for safety. Of course, potential holes or cavities within the floor system must also be considered in determining the proper depth of a floor system if it is necessary to accommodate heating, plumbing, or electrical conduits.

Utility conduits normally run parallel to joists in floor systems. Under certain conditions, however, these conduits may run perpendicular to, and penetrate, the joists. Local building codes have strictly mandated that a transverse hole bored or cut into a joist for accommodating a conduit shall not be closer than 2 inches to the top or bottom of the joist. Further, the diameter of the hole shall not exceed one-third of depth of the joist. Limits have also been placed upon the distance from the end of the joist where a transverse hole can be located.

Holes for plumbing drain conduits, with their relatively large diameters, are particularly difficult to position in the wooden joists typically used in residential building structures. A conventional plumbing drain conduit having an outside diameter of 3¼ inches, for instance, cannot in many areas be lawfully passed through a 2×10 joist having actual dimensions of 1⅝ inches by 9¼ inches. The 3⅝ inch hole needed to accommodate the 3 ¼ inch diameter conduit fails to satisfy the building code requirement that the hole not exceed one-third of depth of the joist. Thus, residential builders have had to utilize joists having larger nominal dimensions of 2 inches by 12 inches which are more expensive and somewhat heavier in weight. A need, therefore, exists for a bracket which can act as a "patch kit" to reinforce a wooden joist having a transverse hole to such an extent that it is equal in load-bearing capacity to that of a similarly dimensioned joist that lacks any transverse holes.

SUMMARY OF THE INVENTION

In view of the foregoing need, it is a principal object of the invention to provide a bracket for reinforcing a wooden joist having a hole therein. The bracket includes a base wall having a central opening, sized to accommodate a utility conduit disposed within the hole, for positioning against one side of the wooden joist. A pair of side walls extend at right angles from the base wall so as to provide the bracket, alternatively, with a C-shaped or S-shaped cross section. For strength, a pair of flanges extend at right angles from the pair of side walls so as to be parallel to the base wall.

It is another object of the invention to provide a joist reinforcing bracket of the type described that has a high strength yet is uncomplicated in construction. Thus, the base wall, side walls and flanges are preferably integrally formed from a bent strip of sheet metal. To accommodate the passage of a large utility conduit, the central opening in the base wall has a preferred diameter equal to at least two-thirds of the depth of the base wall.

Still another object of the invention is to provide a joist reinforcing bracket with a plurality of relatively smaller openings about the central opening for the receipt of nails or other piercing fasteners for securing the bracket to a wooden joist.

It is an object of the invention to provide improved elements and arrangements thereof in a joist reinforcing bracket for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENTS

Figure 1:
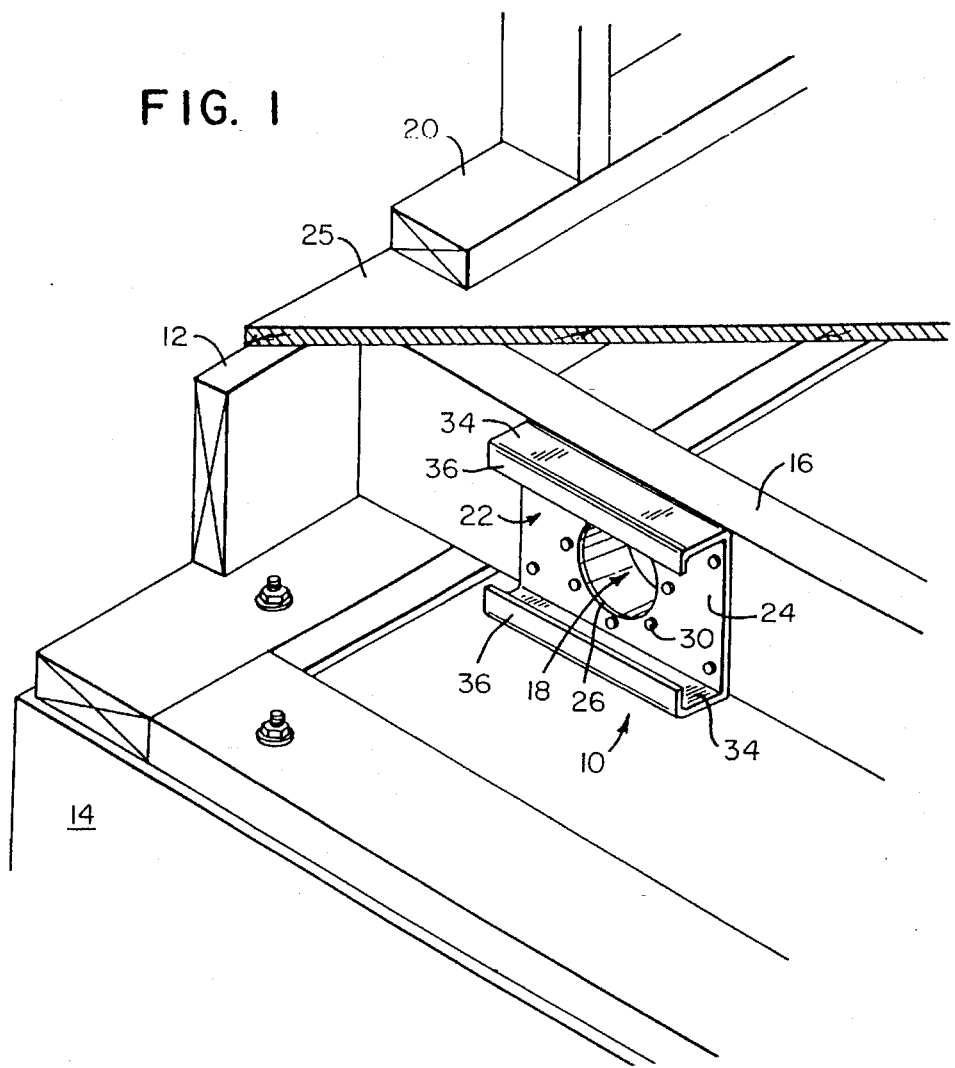
FIG. 1 is a perspective view of a joist reinforcing bracket in accordance with the present invention positioned within a floor system.
Figure 2:
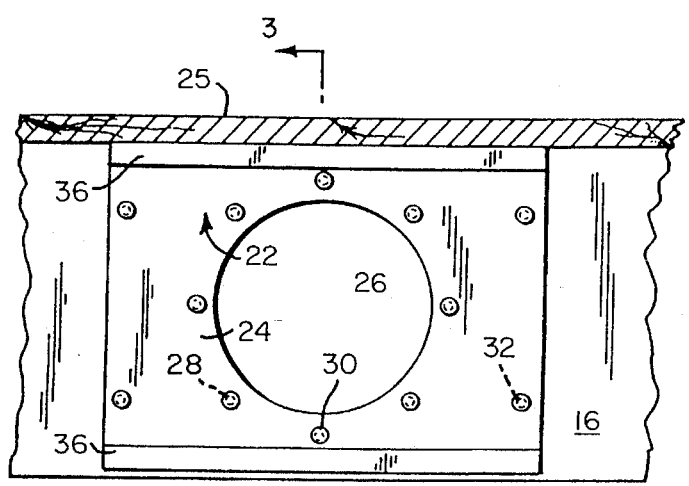
FIG. 2 is a front elevational view of the joist reinforcing bracket of FIG. 1.
Figure 3:
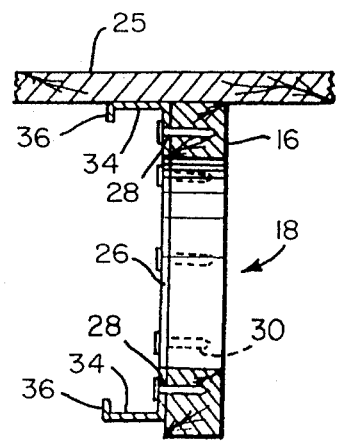
FIG. 3 is a cross-sectional view of the joist reinforcing bracket taken along line 3—3 of FIG. 2.

Referring now to FIG. 1 of the drawings, a joist reinforcing bracket 10 is shown in use within a conventional wood joist floor system. The floor system preferably includes a header 12 supported at a fixed height by a base wall 14. A joist 16 extends laterally from the header 12 to a remote support (not shown). A transverse hole 18 is provided in the joist 16 for the installation and passage of one or more utility conduits (not shown) therethrough. Like the header 12, the joist 16 preferably comprises a predetermined length of construction grade lumber cut to suitable dimensions, e.g., a nominal 2×10 inches. Atop the header 12 and joist 16 is secured a rigid subfloor 25 of plywood sheathing adapted to carry one or more wall frames 20 of wood or metal construction.

Although only one joist 16 is illustrated in FIG. 1 for the sake of simplicity, it should be understood that additional joists 16 are typically employed in the construction of a finished floor system. In such a floor system, a plurality of like joists 16 would usually be laterally spaced along the header 12 on the order of 16 to 24 inches apart depending upon anticipated structural loads. As a joist reinforcing bracket 10 may be secured to only one joist 16 during use, a plurality of joist reinforcing brackets 10 would typically be employed in a finished floor system wherein corresponding holes for the passage of an elongated conduit are formed in several of the joists 16. Of course, a plurality of brackets 10 may be secured to a single joist 16 should the need arise.

As shown, the joist reinforcing bracket 10 includes a rigid body 22 of C-shaped cross section. The C-shaped body 22 is conventionally formed by rolling or bending a thin, rectangular strip of sheet metal into the desired shape. Preferably, sheet metal comprising 18-gage galvanized steel, or any other suitable metallic composition, is utilized in forming the C-shaped body 22.

The C-shaped body 22 includes a substantially flat, base wall 24 adapted to engage one side of the joist 16. As shown, the depth of the base wall 24 is substantially the same as that of the joist 16, or approximately 9 inches in the preferred embodiment. The length of the base wall 24, on the other hand, may be varied to suit the needs of a particular user; however, 12 inches has been determined to be suitable for use in conventional wood joist floor systems.

The base wall 24 includes a central opening 26 having a diameter that is ⅔ of the depth of the base wall 24. In the preferred embodiment, then, the central opening has a diameter of 6 inches which will accommodate the passage of most mechanical and electrical conduits employed in modern residential building construction. Angularly positioned about the central opening at 45 degree intervals are a plurality of secondary openings 28 which permit the passage of screws or nails 30 for securing the bracket 10 to the joist 16. A pair of tertiary holes 32 are positioned adjacent each of the ends of the base wall 24 for the passage of additional screws or nails 30 if desired by a user.

Should it be desired that the bracket 10 be permanently fixed to the joist 16, a thin film of a well-known, liquid, adhesive cement (not shown) may be applied to the base wall 24 prior to its positioning adjacent the joist 16. If adhesive cement of sufficient strength is used, it may be possible to install the bracket 10 without any screws or nails 30. Thus, holes 28 and 32 may be deleted from the base wall 24.

Although the holes 26, 28 and 32 are preferably circular in outline, such may be provided with any desired shape. Thus, by way of example only, the holes 26, 28 and 32 may be triangular, square or oval in outline. Nevertheless, as the holes 26, 28 and 30 occupy approximately 3/10 of the lateral area of the base wall 24, it would be desirable to maintain this ratio if the relative size or shape of any of the holes 26, 28 and 30 were modified so as to minimize the weight of the bracket 10.

A pair of parallel side walls 34 extend outwardly at right angles from one side of the base wall 24. In the preferred embodiment, the side walls 34 extend outwardly 1 ½ inches from the base wall 24. The outer ends of the side walls 34 are preferably deformed to provide a pair of inwardly directed flanges 36 for improving the stiffness of the side walls 34 and the C-shaped body 22. As shown, the flanges 36 are oriented substantially parallel to the base wall 36. The flanges 36 preferably have a width of ½ inch.

Figure 4:
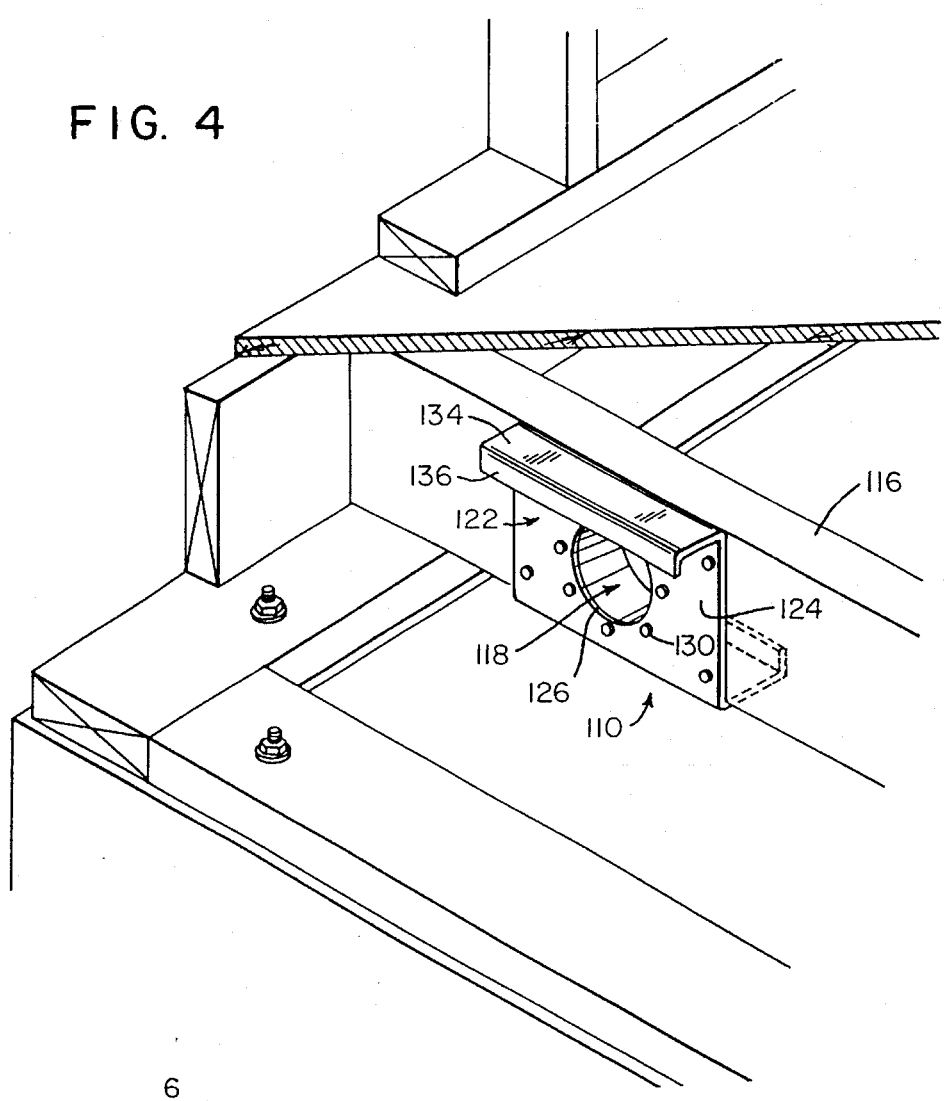
FIG. 4 is a perspective view of an alternative joist reinforcing bracket in accordance with the present invention positioned within a floor system.
Figure 5:
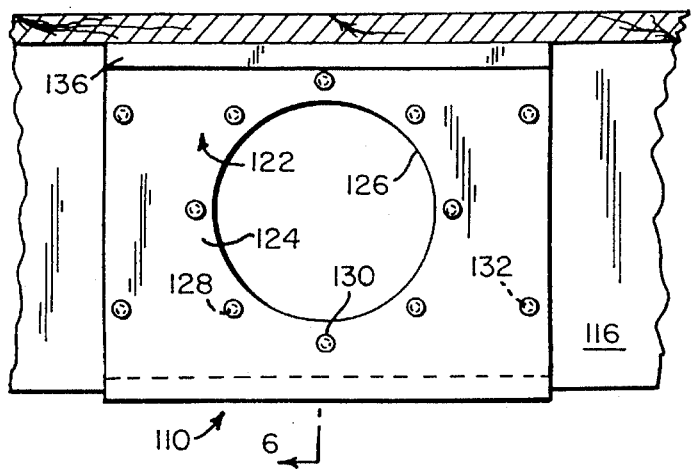
FIG. 5 is a front elevational view of the alternative joist reinforcing bracket of FIG. 4.
Figure 6:
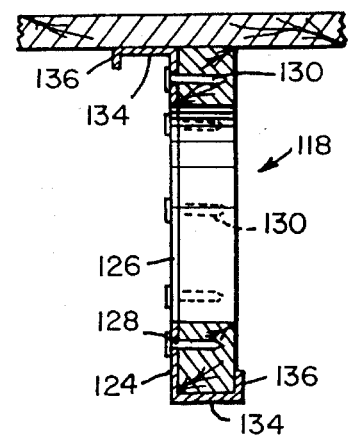
FIG. 6 is a cross-sectional view of the alternative joist reinforcing bracket taken along line 6—6 of FIG. 5.

Referring now to FIGS. 4–6, an alternative embodiment of the joist reinforcing bracket is illustrated generally at 110. As may be seen, the bracket 110 includes elements that correspond generally to those of the bracket 10 described in detail hereinabove. Nonetheless, the bracket 110 has been modified to engage two surfaces of the joist 116 to which it is secured.

The joist reinforcing bracket 110 includes a rigid body 122 of S-shaped cross section suitably formed from a thin, rectangular strip of sheet metal. The S-shaped body 122 includes a substantially flat, base wall 124 measuring approximately 9 inches in depth by 12 inches in length and adapted to engage one side of the joist 116 from top to bottom. The base wall 124 includes a central opening 126 having a diameter of 6 inches for positioning adjacent a hole 118 in the joist 116. Angularly positioned about the central opening 126 at 45 degree intervals are a plurality of secondary openings 128 for the passage of screws or nails 130 to secure the bracket 110 to the joist 116. A pair of tertiary openings 132 are positioned adjacent each of the ends of the base wall 124 for the passage of additional screws or nails 130.

A pair of side walls 134 extend outwardly at right angles from opposing sides of the base wall 124. In the alternative embodiment shown, the side walls 134 preferably extend outwardly 1 ¾ inches from the base wall 124; however, any distance sufficient to permit engagement of one of the side walls 134 with the bottom of the joist 116 would be adequate. The outer ends of the side walls 134 are preferably deformed to provide a pair of inwardly directed flanges 136 having a width of ½ inch. As shown, the flanges 136 are oriented substantially parallel to the base wall 124.

When the brackets of the present invention are properly installed on a joist or other building member as described hereinabove, a joist having a transverse hole will be reinforced to be equal in load-bearing capacity to that of a similarly dimensioned joist that lacks any transverse holes. As it is intended that the reinforced joist obtain its principal strength from the inventive bracket itself, a hole may be provided virtually anywhere in the joist without a reduction of the usual load-bearing capacity thereof.

From the foregoing, it should be apparent that the present invention provides residential builders with great flexibility in the positioning of utility conduits within floor systems assembled with wooden joists. It should be noted also that with the invention, wooden joists having transverse holes for positioning utility conduits can be provided with somewhat smaller dimensions than would otherwise be permitted by local building codes. Thus, the present invention contributes to the conservation of natural resources while simultaneously reducing building costs.

While the invention has been described with a high degree of particularity, it will be appreciated by those skilled in the art that numerous modifications and substitutions may be made thereto. Therefore, it is to be understood that the present invention is not limited to the several embodiments described above, but encompasses any and all embodiments within the scope of the following claims.

We claim:

1. A bracket for reinforcing a wooden joist, comprising:

a base wall adapted for positioning against one side of a wooden joist, said base wall having a length and a depth, said base wall further having a central opening therein for the passage of a utility conduit, said central opening having a diameter equal to at least one-half of the depth of said base wall and further having a diameter equal to at least one-half of the length of said base wall;

a pair of side walls integral with said base wall and extending at right angles therefrom; and, a pair of flanges integral with said pair of side walls and extending at right angles therefrom so as to be parallel to said base wall.

2. The bracket for reinforcing a wooden joist according to claim 1 wherein said central opening has a diameter equal to at least two-thirds of the depth of said base wall.

3. The bracket for reinforcing a wooden joist according to claim 1 wherein each of said side walls extends from the same side of said base wall so as to provide said bracket with a C-shaped cross section.

4. The bracket for reinforcing a wooden joist according to claim 1 wherein each of said side walls extends from an opposite side of said base wall so as to provide said bracket with an S-shaped cross section.

5. The bracket for reinforcing a wooden joist according to claim 1 wherein said base wall further includes a plurality of secondary openings angularly positioned about said central opening.

6. The bracket for reinforcing a wooden joist according to claim 5 wherein said base wall further includes a pair of tertiary openings proximate each end thereof.

7. The bracket for reinforcing a wooden joist according to claim 1 wherein said base wall, said pair of side walls and said pair of flanges are integrally formed from a bent strip of sheet metal.

8. The joist reinforcing bracket, comprising:

base wall adapted for positioning against one side of a wooden joist, said base wall having a length and a depth, said base wall further having a central opening therein for the passage of a utility conduit, said central opening having a diameter equal to at least one-half of the depth of said base wall and further having a diameter equal to at least one-half of the length of said base wall;

a pair of side walls integral with said base wall and extending at right angles from a single side of said base wall so as to provide said joist reinforcing bracket with a C-shaped cross section; and, a pair of flanges integral with said pair of side walls and extending at right angles therefrom so as to be parallel to said base wall.

9. The joist reinforcing bracket according to claim 8 wherein said central opening has a diameter equal to at least two-thirds of the depth of the base wall.

10. The joist reinforcing bracket according to claim 8 wherein said base wall further includes a plurality of secondary openings angularly positioned about said central opening.

11. The joist reinforcing bracket according to claim 10 wherein said base wall further includes a pair of tertiary openings proximate each end of said base wall.

12. The joist reinforcing bracket according to claim 8 wherein said base wall, said pair of side walls and said pair of flanges are integrally formed from a bent strip of sheet metal.

13. A joist reinforcing bracket, comprising:

a base wall adapted for positioning against one side of a wooden joist, said base wall having a length and a depth, said base wall further having a central opening therein for the passage of a utility conduit, said central opening having a diameter equal to at least one-half of the depth of said base wall and further having a diameter equal to at least one-half of the length of said base wall;

a pair of side walls integral with said base wall, each of said side walls extending at right angles from an opposite side of said base wall so as to provide said joist reinforcing bracket with an S-shaped cross section; and, a pair of flanges integral with said pair of side walls and extending at right angles therefrom so as to be parallel to said base wall.

14. The joist reinforcing bracket according to claim 13 wherein said central opening has a diameter equal to at least two-thirds of the depth of the base wall.

15. The joist reinforcing bracket according to claim 13 wherein said base wall further includes a plurality of secondary openings angularly positioned about said central opening.

16. The joist reinforcing bracket according to claim 15 wherein said base wall further includes a pair of tertiary openings proximate each end of said base wall.

17. The joist reinforcing bracket according to claim 13 wherein said base wall, said pair of side walls and said pair of flanges are integrally formed from a bent strip of sheet metal.

\* \* \* \* \*